United States Patent
Suzuki

(10) Patent No.: US 8,967,479 B2
(45) Date of Patent: Mar. 3, 2015

(54) IMAGE PROCESSING APPARATUS AND METHOD FOR CONVERTING A COLOR BARCODE INTO A MONOCHROME BARCODE

(71) Applicant: Toshiba Tec Kabushiki Kaisha, Tokyo (JP)

(72) Inventor: Minoru Suzuki, Kanagawa (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 39 days.

(21) Appl. No.: 13/797,535

(22) Filed: Mar. 12, 2013

(65) Prior Publication Data
US 2013/0233927 A1    Sep. 12, 2013

Related U.S. Application Data

(60) Provisional application No. 61/609,962, filed on Mar. 12, 2012.

(51) Int. Cl.
| | |
|---|---|
| G06K 7/10 | (2006.01) |
| G06K 7/00 | (2006.01) |
| G06K 19/08 | (2006.01) |
| G06F 3/12 | (2006.01) |
| G06K 15/00 | (2006.01) |
| G06K 7/14 | (2006.01) |
| G06K 7/12 | (2006.01) |

(52) U.S. Cl.
CPC ............... *G06K 7/1439* (2013.01); *G06K 7/12* (2013.01); *G06K 7/1447* (2013.01)
USPC .......... 235/462.01; 235/462.04; 235/462.08; 358/1.13; 358/1.18

(58) Field of Classification Search
CPC ..... G06K 7/14; G06K 7/1408; G06K 7/1413; G06K 7/1417; G06K 7/1439; G06K 7/1447; G06K 19/06; G06K 19/06046; G06K 19/0637; G06K 19/0614; G06K 19/06028
USPC ............... 235/462.01, 462.04, 469, 494, 375; 358/1.9, 1.13–1.15, 474, 502, 505
See application file for complete search history.

(56) References Cited

U.S. PATENT DOCUMENTS

| | | | |
|---|---|---|---|
| 7,118,041 B2 * | 10/2006 | Taylor | 235/462.09 |
| 7,474,445 B2 | 1/2009 | Suzuki et al. | |
| 8,264,736 B2 * | 9/2012 | Hopper et al. | 358/1.18 |
| 8,500,026 B2 * | 8/2013 | Fan et al. | 235/469 |
| 2006/0187475 A1 * | 8/2006 | Fujioka | 358/1.9 |
| 2007/0002354 A1 * | 1/2007 | Iwasaki | 358/1.13 |
| 2008/0048044 A1 * | 2/2008 | Zhao et al. | 235/494 |
| 2009/0244653 A1 | 10/2009 | Hashimoto | |
| 2013/0092738 A1 * | 4/2013 | Blasinski et al. | 235/462.04 |
| 2014/0027516 A1 * | 1/2014 | Fushiki | 235/462.04 |
| 2014/0029026 A1 * | 1/2014 | Saida | 358/1.9 |

* cited by examiner

*Primary Examiner* — Michael G Lee
*Assistant Examiner* — Suezu Ellis
(74) *Attorney, Agent, or Firm* — Patterson & Sheridan LLP

(57) ABSTRACT

An image processing apparatus has an image read unit configured to form image data from a scanned original and an image processing unit configured to process the image data to identify a color barcode therein, convert the color barcode into a monochrome barcode, and generate new image data that contains the monochrome barcode in place of the color barcode.

16 Claims, 7 Drawing Sheets

IMAGE PROCESSING APPARATUS AND METHOD FOR CONVERTING A COLOR BARCODE INTO A MONOCHROME BARCODE

CROSS-REFERENCE TO RELATED APPLICATION

This application is based upon and claims the benefit of priority from U.S. Provisional Patent Application No. 61/609,862, filed on Mar. 12, 2012; the entire contents of which are incorporated herein by reference.

FIELD

Embodiments described herein relate to an image processing apparatus and an image processing method for converting information containing a read object into an electric signal for storage or output.

BACKGROUND

The original, which is a read object, may contain barcode or other encoded information. The encoded information may often be a color barcode (color code sequence) alongside matrix-shaped color blocks. Even though the original contains a color barcode, the information of the original may be read (scanned) in a monochrome mode. In this case, when a scan is generated or a copy of the original is made, the color barcode is output in monochrome. Once the color barcode is output in monochrome, it cannot be decoded back to the original color barcode.

DETAILED DESCRIPTION

Embodiments provide an image processing apparatus and an image processing method for converting non-monochrome information contained in a read object into an electric signal corresponding to the monochrome information, which is then stored or output.

In general, according to one embodiment, the present disclosure will be explained with reference to the drawings.

An image processing apparatus according to an embodiment has an image read unit configured to form image data from a scanned original and an image processing unit configured to process the image data to identify a color barcode therein, convert the color barcode into a monochrome barcode, and generate new image data that contains the monochrome barcode in place of the color barcode.

Figure 1:
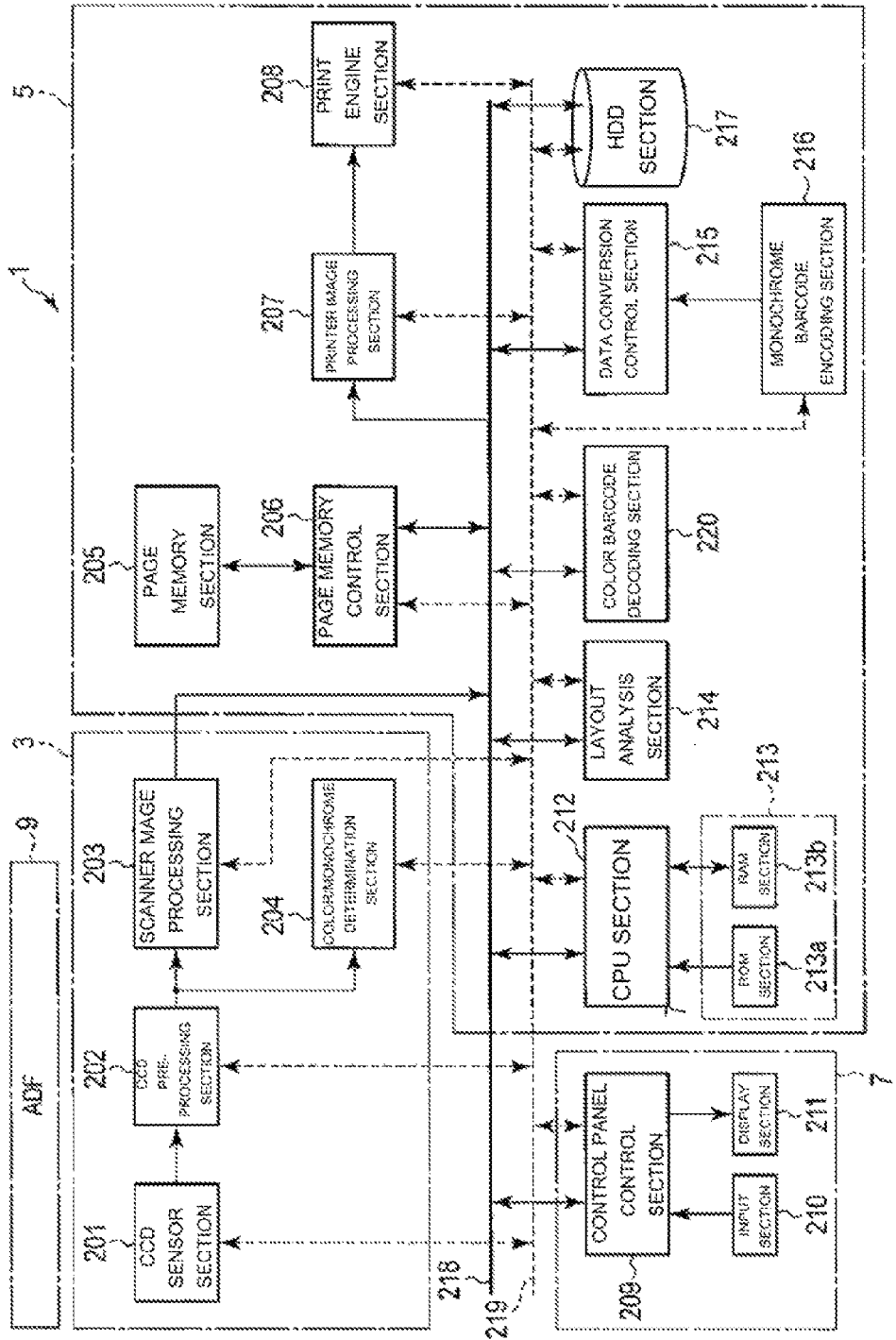
FIG. 1 is a block diagram illustrating an image processing apparatus according to an embodiment.

FIG. 1 shows an example of an image processing apparatus in which embodiments may be implemented. Here, an image processing apparatus 1 contains an image read section 3, an image processing section 5, and an operation input section 7. In addition, an automatic original transporting device (ADF, automatic document feeder) 9, which feeds the original when the read object from which information is read by the image read section 3 is a sheet-shaped original, is annexed to the image processing apparatus 1.

The image read section 3 has a CCD sensor section 201, a CCD pre-processing section 202, a scanner image processing section 203, a color/monochrome determination section 204, etc. Here, the CCD sensor section 201 converts image light of the original positioned at a prescribed read position by the ADF 9 to image data (electric analog signal). The CCD pre-processing section 202 converts the analog signal from the CCD of the CCD sensor section 201 to a digital signal (A/D conversion). The scanner image processing section 203 carries out correction of the characteristics of the CCD element, correction related to the optical system of the scanner section, range correction, filter process, and other image processing needed for later-stage processing. The color/monochrome determination section 204 determines whether the read original is a color original or a monochrome original, that is, whether a color portion is contained in the portion of one page.

The image processing section 5 has a page memory section 205, a page memory control section 206, a CPU section (main control block) 212, a memory section 213 (ROM section 213a, RAM section 213b), a layout analysis section 214, a data conversion control section 215, a monochrome barcode encoding section 216, an HDD section (storage section) 217, a color barcode decoding section 220, a printer image processing section 207, a print engine section (image forming section) 208, etc.

The page memory section 205 is a memory unit that temporarily stores the image data of one or more pages. The page memory control section 206 carries out control of data read/write in the page memory section 205.

The CPU section 212 controls the RAM section 213b according to a program stored in the ROM section 213a of the memory section 213, and, at the same time, makes setting and issues instructions via the common (control) bus 219 of the CPU section 212 to the various blocks. In addition, the CPU section 212 carries out read and other processing, such as read of the process results of the various blocks, and it makes overall control for the entire system.

The layout analysis section 214 carries out extraction of the color barcode region from the image data for each page portion.

The data conversion control section 215 rewrites the color barcode to, e.g., the monochrome code. The data conversion control section 215 also converts the color scanned file to the monochrome scanned file.

The monochrome barcode encoding section 216 encodes the data obtained by decoding the color barcode to the monochrome barcode.

When there is an instruction of "process of automatic formation of the monochrome data", the color barcode decoding section 220 reads the color barcode of the color barcode region and carries out decoding process.

The HDD section 217 stores the color scanned file in scanning, and it stores the processed monochrome scanned file.

The printer image processing section 207 carries out the filter process, tone process, and other image processing needed for print.

The print engine section 208 carries out the print control of the printer data processed by the printer image processing section 207.

These sections are partially connected to the common data bus 218, and, according to the control procedure of the data bus 218, data transfer between blocks is carried out.

In addition, for the operation and control in the individual processing blocks, not only the individual processing blocks can be realized by ASIC (Application Specific IC) or other semiconductor circuit, but they can also be partially or entirely formed by software.

The operation input section 7 has a control panel control section 209, an input section 210 and a display section 211. Here, the input section 210 and the display section 211 may have an integrated touch panel structure in a portion or the entirety of them.

In the monochrome scan mode, after start of the scan operation, by means of the overall control of the CPU section 212, first of all, the one-page image data of the original is read as the color signal by the CCD sensor section 210. In the read color signal, as the color image data, the CCD pre-processing section 202 and the scanner image processing section 203 carry out the process preset in the CPU section 212. The image data processed by the scanner image processing section 203 are temporarily stored in the page memory section 205 by the page memory control section 206, and they are then stored as the color scanned file in the HDD section 217.

In this case, the color/monochrome determination section 204 determines whether there is a color portion in the page. If there is no color portion, after end of read of the current page, scanning of the next page is executed.

The color/monochrome determination section 204 determines whether the image is a color image or a monochrome image by comparing various color histogram values of the R signal, G signal and B signal of the image data output from the CCD pre-processing section 202.

When there is a color portion, the CPU section 212 has the corresponding page no. stored in the RAM section 213b, and, after end of read of the current page, scanning of the next page is carried out.

Figure 2:
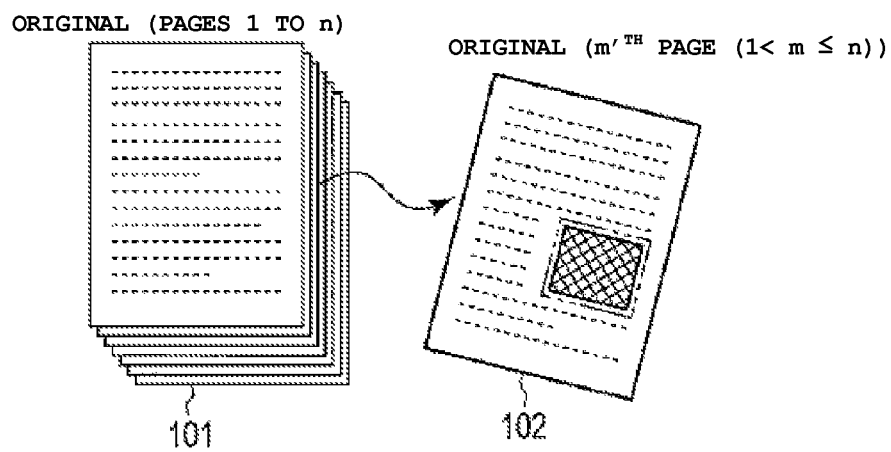
FIG. 2 is a diagram illustrating an example of a read object.
Figure 3:
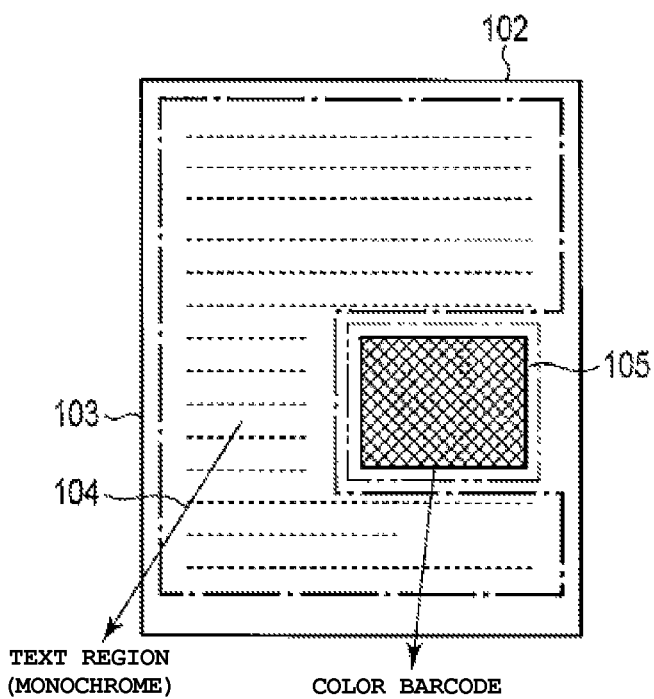
FIG. 3 is a diagram illustrating an example of a color barcode.

FIG. 2 is a schematic diagram illustrating a color original. It shows an example in which there is a page 102 having a color barcode (non-monochrome image) on the m-th page among the n pages of a monochrome document (original) 101. FIG. 3 shows an example of the color barcode. In this example, the 8-row×4-column (M×N) matrix contains a 3-color pattern of R (red), B (blue) and Y (yellow) in rectangular or any other shape (round shape or the like). More specifically, e.g., B11 of blue (B) is at M=1, N=1 (upper-left portion). Similarly, Y21 of yellow (Y) is at M=1, N=2; R31 of red (R) is at M=1, N=3; and Y41 of yellow (Y) is at M=1, N=4.

The image data of the original 101 shown in FIG. 2 are read one page each time. During this period, it is determined that the m-th page 102 is a page containing a color portion (color barcode), and this status is stored in the RAM section 213b.

At the end, when all of the pages of the original are scanned and stored in the HDD section 217, the CPU section 212 takes the scanned image file stored in the RAM section 213b as a reference. When there is no page where a color portion is detected, the color image data (scanned image file) stored in the HDD section 217 is loaded into the page memory section 205 one page at a time under control of the page memory control section 206. Then, under control of the data conversion control section 215, the data are converted to the monochrome image file that is then stored in the HDD section 217. After end of the monochrome formation for the image data (scanned image file) of all of the pages, the file of the scan process results is managed, and the user can acquire it. The entire process then comes to an end.

Figure 4:
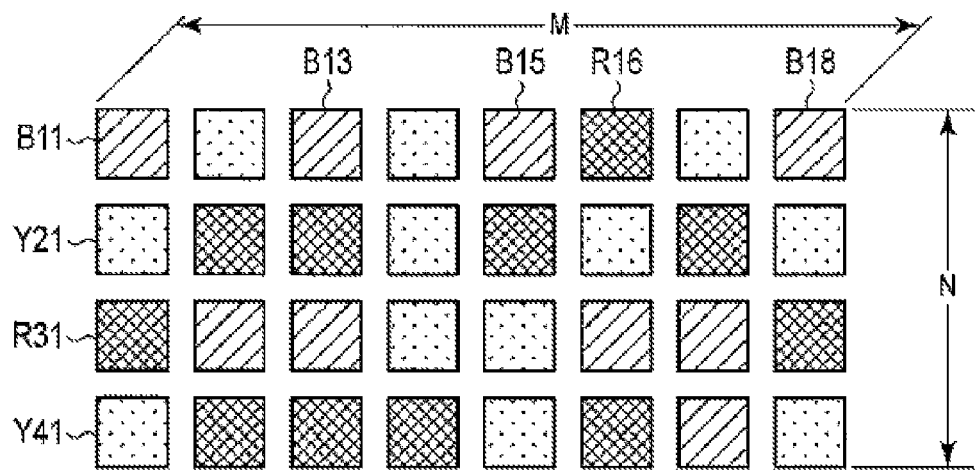
FIG. 4 is a diagram illustrating an example of a color code sequence of the color barcode.
Figure 5:
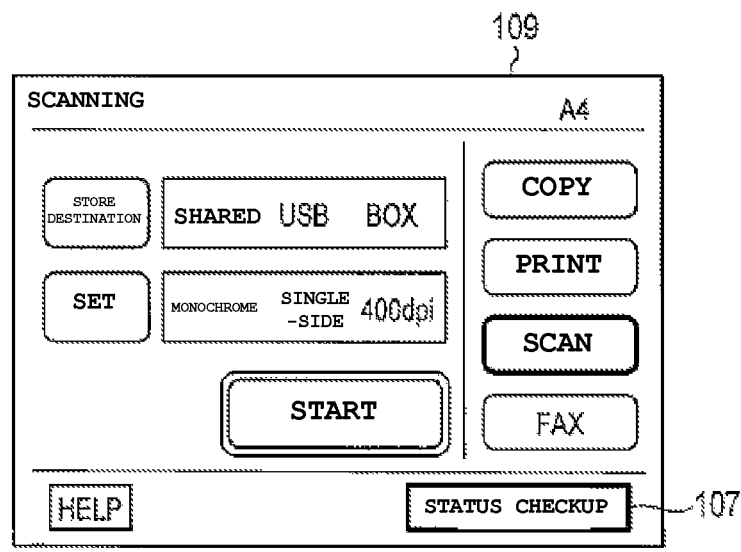
FIG. 5 is a diagram illustrating an example display of a display section of the image processing apparatus according to the embodiment.

When the page data 103 have the color portion (color barcode) 105 (shown in FIG. 3) detected in the monochrome (text region 104), the "status checkup" button 107 shown in FIG. 4 is displayed on an operation image 109 of the scan mode displayed on the display section 211 of the control panel control section 209 by the CPU section 212.

Figure 6:
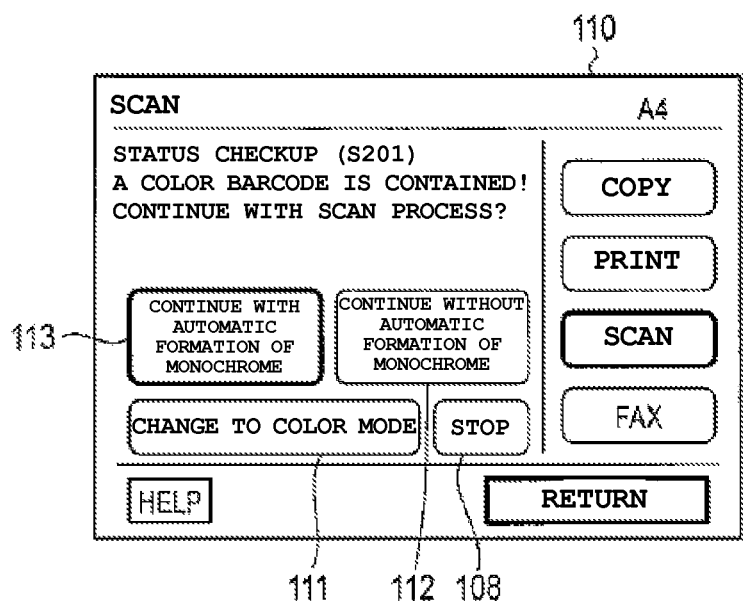
FIG. 6 is a diagram illustrating another example display of the display section of the image processing apparatus according to the embodiment.

When the user presses on the "status checkup" button 107, the information from the input section 210 ("status checkup" button 107 is on) is recognized by the CPU section 212 via the control panel control section 209. On the basis of the recognition result, the CPU section 212 sends an instruction to the control panel control section 209 according to the data (program) stored in the ROM section 213a to show a status checkup image display 110 on the display section 211 as shown in FIG. 6. Here, the status checkup image display 110 shows the message 5201 with the content of "Color barcode is contained. Continue with scan process?"

If the user selects stop of the scan operation, the input section 210 (control panel 209) has the "stop" button 108 turned on, and the CPU section 212 makes recognition via the control panel control section 209. Then, the color scanned image file stored in the HDD section 217 is deleted, and the entire process comes to an end.

If the user wants to acquire the scanned file as the color file, on the status checkup image display 110, the button 111 of "change to color mode" is pressed, so that the information from the input section 210 is recognized by the CPU section 212. Then, the color scanned image file stored in the HDD section 217 is managed as the file of the scan process result, and the user can acquire it. The entire process comes to an end.

If the user wants to continue the scan process without carrying out the process for automatic formation of the monochrome data to be explained later, on the status checkup image display 110, the button 112 of "Continue without automatic formation of the monochrome data" is pressed to turn on the function, so that the information from the input section 210 is recognized by the CPU section 212. In this case, the color scanned image file (image data) stored in the HDD section 217 is loaded into the page memory section 205 one page at a time under control of the page memory control section 206. Then, the data conversion control section 215 converts the color image file to the monochrome image file that is then stored in the HDD section 217 again. Also, the file is managed as the file of the scan process result, and process is carried out so that the user can acquire the file. The entire process comes to an end.

If the user wants to carry out the process of automatic formation of the monochrome data and to continue the scan process, on the status checkup image display 110, a button 113 of "Continue with automatic formation of the monochrome data" is pressed to turn on the function, the information from the input section 210 is recognized via the control panel control section 209 by the CPU section 212. Then, the color detection result stored in the RAM section 213b is taken as reference. According to the reference result, the data of the page containing the color portion (color barcode) are loaded from the color scanned image file stored in the HDD section 217 into the page memory section 205 by the page memory control section 206.

The CPU section 212 issues an instruction to the layout analysis section 214 to make layout analysis process for the page data loaded into the page memory section 205.

The layout analysis section 214 accesses the page data on the page memory section 205 via the page memory control section 206, and it analyzes the region of the color barcode (color image) in the page.

When there is no color barcode region, the CPU section 212 takes the color detection result stored in the RAM section 213b as reference, and carries out the same layout analysis on the next page that contains the color portion.

When the layout analysis for the color detection results stored in the RAM section 213b comes to an end for all of the pages, and no color barcode region is detected, the following formation of the monochrome data is carried out. That is, the CPU section 212 has the color scanned image file stored in the HDD section 217 loaded into the page memory section 205 one page at a time. In the following, the individual page data (scan image file) are converted by the data conversion control section 215 to the monochrome image file, which is then stored in the HDD section 217 again. For all of the page data, management is carried out as the file of the scan processing result, and the user can acquire it at a later time. The entire process comes to an end.

In the layout analysis, if the color barcode region is detected, the CPU section 212 instructs the layout analysis section 214 to carry out the "process of automatic formation of the monochrome data" for the page.

When there is an instruction of "process of automatic formation of the monochrome data", the color barcode of the color barcode region in the page data of the page where the color barcode region 105 is detected is read and subject to a decoding process by the color barcode decoding section 220.

The decoded data are temporarily stored by the CPU section 212 in the RAM section 213b, and they are then transferred to the monochrome barcode encoding section 216.

The monochrome barcode encoding section 216 converts the data from the RAM section 213b to the data of the monochrome barcode.

The data conversion control section 215 sends the data of the monochrome barcode to the page memory control section 206, and has the portion of the color barcode region in the page data in the page memory section 205 rewritten to the data of the monochrome barcode.

After end of the rewrite operation, under the instruction of the CPU section 212, the page memory control section 206 sends the page data in the page memory section 205 where rewrite has ended to the HDD section 217. The data for which rewrite ends are overwritten on the initial file stored in the HDD section 217. As a result, the "process of automatic formation of the monochrome data" ends for this page.

Then, the CPU section 212 takes the color detection result stored in the RAM section 213b as a reference, and it specifies the next page containing the next color portion. The data corresponding to the prescribed page are loaded into the page memory control section 206 from the color scanned image file stored in the HDD section 217 to the page memory section 205. Then, from the layout analysis, the "process of automatic formation of the monochrome data" is carried out repeatedly.

Upon the end of the layout analysis for all of the pages corresponding to the color detection result stored in the RAM section 213b, the CPU section 212 has the color scanned image file stored in the HDD section 217 loaded into the page memory section 205 one page at a time. The loaded page data are converted to the monochrome image file by the data conversion control section 215, and the converted file is stored in the HDD section 217 again. In the following, the file is managed as the monochrome file as the scan process result, and process is carried out so that the user can acquire it. The entire process comes to an end.

Figure 8:
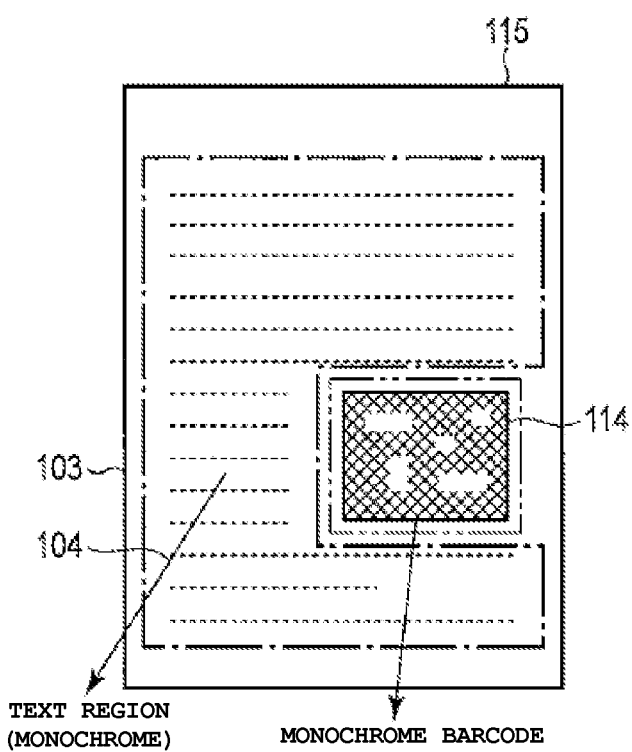
FIG. 8 is a diagram illustrating an example of a print copy output of the image processing apparatus according to the embodiment.

FIG. 8 is a diagram illustrating an example of the process result after the color barcode portion 105 is rewritten by a monochrome barcode 114 after all processing is ended. Here, an output image 115 that is printed and output on the basis of the page data for which the "process of automatic formation of the monochrome data" is carried out contains the portion as the color barcode region 105 of the original 102 shown in FIG. 3 is converted to the monochrome code 114 and is output.

In addition, under the instruction of print by the user, the monochrome scan image file stored in the HDD section 217 after the "process of automatic formation of the monochrome data" is output as the print output of the print engine section 208 after the prescribed image process of the printer image processing section 207.

Figure 7A:
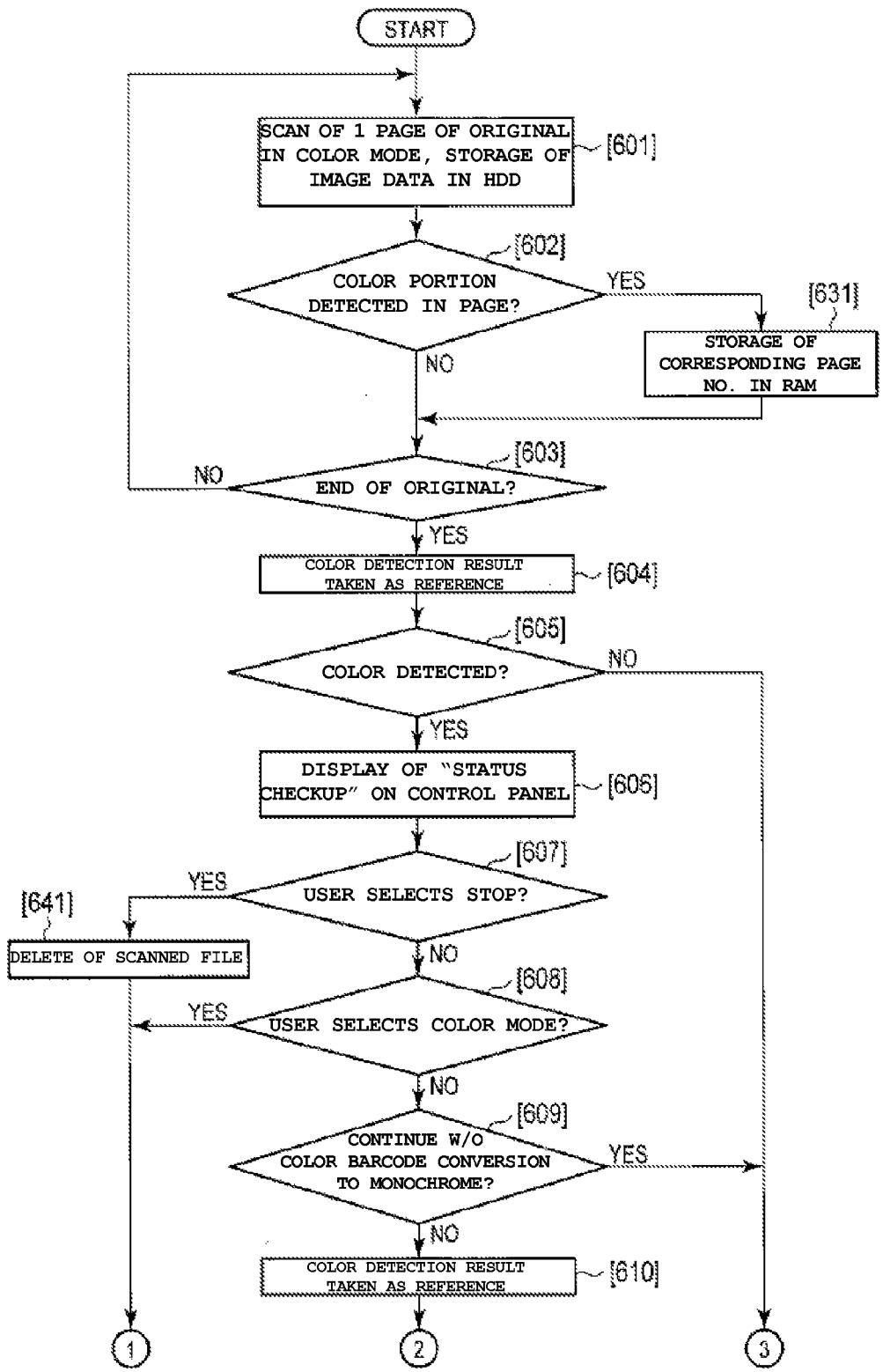
FIGS. 7A and 7B are diagrams illustrating an example operation of the image processing apparatus according to the embodiment.
Figure 7B:
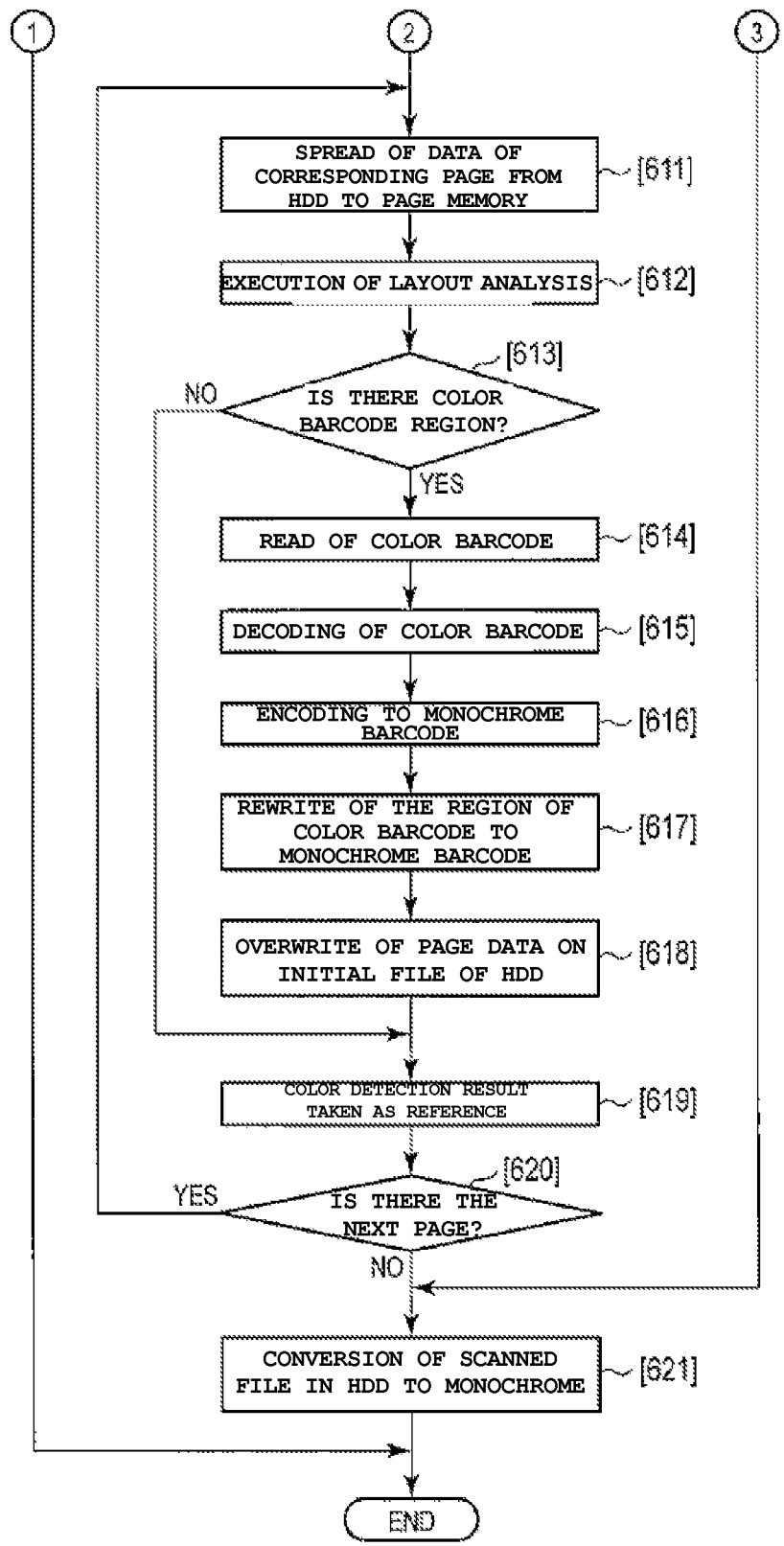

FIG. 7A and FIG. 7B illustrate a series of operations carried out according to software (software program that is stored in a non-transitory computer readable medium).

According to the instruction of the user, one page of the original is scanned in the color mode, and the scanned image data are stored in the HDD [601].

When a color portion is detected in the page [YES in 602], the corresponding page no. is stored in the RAM [631].

When no color portion is detected in the page [NO in 602], determination is made as to whether there is any original remaining original [603]. If there is any original remaining [NO in 603], one page of the remaining original is scanned [601 to 603].

When there is no more original remaining [YES in 603], the color detection result is taken as reference [604].

When there is a color detection [605] in the color detection result [604], the "status checkup" is displayed on the control panel [606].

When the user selects stop [YES in 607], the scanned file is deleted, and the process comes to an end [641]. The process also comes to an end when the user selects the color mode [YES in 608].

When the user does not select stop (NO in 607) and the user does not select the color mode [NO in 608], it is determined whether the user selects to continue without color barcode conversion to monochrome [609].

When the user selects to continue without color barcode conversion to monochrome (when the button 112 of "continue without automatic formation of monochrome" is selected) [YES in 609], the scanned file in the HDD is converted to monochrome [621].

When the user does not select to continue without color barcode formation to monochrome (when the button 113 of "continue with automatic formation of monochrome" is selected) [NO in 609], and the color detection result is taken as reference [610].

In the color detection result [610], the data of the corresponding page where the color is detected are read from the HDD and loaded into the page memory [611], and the layout analysis is carried out on the loaded page data [612].

When the color barcode region is not detected in the layout analysis [NO in 613], the color detection result is taken as reference [619], and, when there is the next page [YES in 620], the data of the corresponding page where the color is detected are read from the HDD and loaded into the page memory [611], and the layout analysis is carried out on the loaded page data [612].

When the color barcode region is detected in the layout analysis [YES in 613], the color barcode is read [614], and the color barcode is decoded [615].

Then, the decoded color barcode is encoded into a monochrome barcode [616], and the region of the color barcode is rewritten with the monochrome barcode [617], and the rewritten page data are overwritten to the initial file of the HDD [618].

With this configuration, even when the user overlooks that the color barcode is contained in the original, and scanning is carried out entirely in the monochrome mode, it is possible to decode the data (information) meaning the color barcode and hold the data in the monochrome barcode, and output in the monochrome mode.

Here, by having a unit configured to notify the user about that a color barcode is contained in the original in the monochrome scan (such as a composite panel display or the like) and a unit configured to instruct the user on whether it is possible to carry out conversion from the non-monochrome single color or the color image region to the monochrome image pattern or execution of conversion of the scanned image data to the monochrome mode, it is possible to select from the following options corresponding to the selection by the user: conversion of color barcode to monochrome image pattern, forming of monochrome mode without conversion, and stop of conversion into monochrome data and storage of the color scanned image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   an image read unit configured to form image data from a scanned original; and
   an image processing unit configured to process the image data to identify a color barcode therein, convert the color barcode into a monochrome barcode, and generate new image data that contains the monochrome barcode in place of the color barcode, wherein
   the image read unit is operable in a monochrome mode and a color mode and is configured to form the image data in the color mode even when the monochrome mode is selected.

2. The image processing apparatus of claim 1, wherein the image processing unit is configured to decode the color barcode to obtain decoded information and encode the decoded information into the monochrome barcode, when converting the color barcode into the monochrome barcode.

3. The image processing apparatus of claim 1, wherein the image processing unit is configured to determine whether or not a color image is contained in the image data prior to processing the image data.

4. The image processing apparatus of claim 1, wherein the image processing unit is configured to process the image data to identify the color barcode when the monochrome mode is selected but not when the color mode is selected.

5. The image processing apparatus of claim 1, further comprising:
   an operation input unit configured to display a first selection to not convert the color barcode into the monochrome barcode and a second selection to convert the color barcode into the monochrome barcode.

6. The image processing apparatus of claim 5, wherein the image processing unit is configured to convert the image data into monochrome when the first selection is made.

7. An image processing method comprising:
   forming scanned image data from an original having multiple pages;
   identifying a page with a color image contained in scanned image data;
   determining the color image to be a color barcode;
   decoding the color barcode to obtain decoded data;
   encoding the decoded data to a monochrome barcode;
   replacing image data corresponding to the color barcode with image data corresponding to the encoded monochrome barcode; and
   detecting a selection of a monochrome mode or a color mode, wherein the scanned image data is formed in color even though the detected selection is the monochrome mode.

8. The method of claim 7, further comprising:
   determining a location of the color image on the page, wherein the image data corresponding to the color barcode is replaced with the image data corresponding to the encoded monochrome barcode so that an image of the monochrome barcode is at the location on the page.

9. The method of claim 7, further comprising:
   determining whether or not the original has color in any of the pages.

10. The method of claim 7, further comprising:
    detecting a selection between not converting the color barcode into the monochrome barcode and converting the color barcode into the monochrome barcode; and
    converting the scanned image data formed in color into monochrome when the selection is made to not convert the color barcode into the monochrome barcode.

11. The method of claim 7, further comprising:
    storing the scanned image data with image data corresponding to the encoded monochrome barcode in place of image data corresponding to the color barcode in a file.

12. The method of claim 7, further comprising:
    printing the scanned image data with image data corresponding to the encoded monochrome barcode in place of image data corresponding to the color barcode.

13. A non-transitory computer readable medium comprising instructions executed in a processing unit of an image forming apparatus to cause the image forming apparatus to perform the steps of:
    forming image data from a scanned original;
    identifying a color barcode in the image data;
    converting the color barcode into a monochrome barcode;
    generating new image data that contains the monochrome barcode in place of the color barcode; and
    detecting a selection of a monochrome mode or a color mode, wherein the image data is formed from the scanned original in color even though the detected selection is the monochrome mode.

14. The non-transitory computer readable medium of claim 13, wherein the step of converting includes:
    decoding the color barcode to obtain decoded information; and
    encoding the decoded information into the monochrome barcode.

15. The non-transitory computer readable medium of claim 13, wherein the steps further include:
 determining whether or not the scanned original has any color pages.

16. The non-transitory computer readable medium of claim 13, wherein the steps of identifying and converting are performed after detecting the selection of the monochrome mode.

\* \* \* \* \*